US006350342B1

(12) United States Patent
Steidinger et al.

(10) Patent No.: US 6,350,342 B1
(45) Date of Patent: Feb. 26, 2002

(54) METHOD OF MAKING INTEGRATED LABEL PRODUCTS

(75) Inventors: Mark S. Steidinger, McHenry; David J. Steidinger, Barrington, both of IL (US)

(73) Assignee: Tamarack Products Inc., Wauconda, IL (US)

(*) Notice: Subject to any disclaimer, the term of this patent is extended or adjusted under 35 U.S.C. 154(b) by 500 days.

(21) Appl. No.: 08/868,935

(22) Filed: Jun. 4, 1997

Related U.S. Application Data

(60) Provisional application No. 60/025,697, filed on Sep. 9, 1996.

(51) Int. Cl.[7] .......... B32B 31/00

(52) U.S. Cl. .......... 156/257; 156/248; 156/249; 156/239; 156/253; 156/268; 156/270; 283/81; 428/42.3

(58) Field of Search .......... 156/302, 238, 156/519, 253, 257, 270, 239, 267, 268, 248, 249; 283/81; 428/42.3

(56) References Cited

U.S. PATENT DOCUMENTS

| | | | | |
|---|---|---|---|---|
| 4,379,573 A | | 4/1983 | Lomeli et al. | 428/42 |
| 4,902,375 A | * | 2/1990 | Holmes et al. | 156/516 |
| 5,011,559 A | | 4/1991 | Felix | 156/257 |
| 5,061,334 A | | 10/1991 | Paules | 156/235 |
| 5,098,759 A | | 3/1992 | Felix | 428/42 |
| 5,129,682 A | | 7/1992 | Ashby | 283/81 |
| 5,271,787 A | | 12/1993 | Hoffmann et al. | 156/268 |
| 5,324,153 A | | 6/1994 | Chess | 412/9 |
| 5,441,796 A | | 8/1995 | Steidinger et al. | 428/195 |
| 5,466,013 A | | 11/1995 | Garrison | 283/107 |
| 5,482,328 A | | 1/1996 | Stewart | 283/81 |
| 5,700,536 A | | 12/1997 | Steidinger | 428/40.1 |

OTHER PUBLICATIONS

Weber "Label–Aire" Label Application Systems brochure (9 pgs.) Mar. 1989 Code A–495–1.

"Label–Aire" Stepper–Driven Wipe–On Applicator, Model 2215ST product data sheets (2 pgs.) 2–1991 Code Rev. 2–91–5M.

Quadrel Labeling Systems Q–80 High Performance Stepper Driven Labeling Head product data sheets (2 pgs.) 1–1992, Code R–1/92.

U.S. application No. 08/852,708, Steidinger, filed May 1997.

* cited by examiner

*Primary Examiner*—Linda Gray
(74) *Attorney, Agent, or Firm*—Emrich & Dithmar

(57) ABSTRACT

A series of transfer patches are spaced along a carrier web at a first repeat. Each transfer patch includes at least a backer ply and a layer of pressure-sensitive adhesive. The transfer patches are removed seriatim from the carrier web and transferred at a predetermined second repeat to a form web with the adhesive adhering to the reverse surface of the form web. The form web is die-cut from the face surface to form an integrated label or card product, depending on the composition of the transfer patches.

23 Claims, 4 Drawing Sheets

METHOD OF MAKING INTEGRATED LABEL PRODUCTS

RELATED APPLICATION

This application claims the benefit of the filing date of co-pending U.S. Provisional Application No. 60/025,697, filed Sep. 9, 1996.

FIELD OF THE INVENTION

The present invention relates to a method of making integrated label products. As used herein, the term "integrated label product" refers to a business form structure wherein a label (or card, as will be explained) is formed by die-cutting (or otherwise delineating) the label in the main web of a continuous segmented business form. A backer ply is located on the "reverse" side of the form, that is, opposite the die cut. The backer ply engages the label ply and extends beyond the periphery of the delineated label to hold the label in position relative to the form web after delineation. Thus, the label remains integral with the form, and the combination of form web, delineated label, adhesive and backer ply is referred to as an "integrated label product". If one or more laminates are added to the label for stiffness or surface protection, the combination of label and laminate are commonly referred to as a "card".

BACKGROUND OF THE INVENTION

In one known method for making integrated label products, pressure-sensitive adhesive transfer tape is supplied in a continuous roll and cut into individual segments which are applied to the reverse side of the form web covering the label portion prior to delineation of the label. When the label is die-cut and peeled off the form, the pressure sensitive adhesive transfers to the back of the labels due to the greater affinity between the adhesive and the reverse side of the form web. That is, the adhesive bonds or adheres more strongly to the back of the form than to the release coating on the backer ply. Labels of this kind are commonly called integrated labels in the industry and are disclosed in U.S. Pat. No. 4,379,573. Integrated cards are made by covering at least one side of the label with plastic film laminate. It is also known to add a second lamination to the back of the first laminate to provide a dry adhesive separation feature for removing the card from the form web. Combinations of these features can be used to make various integrated products.

Separate from the technology of integrated label products, conventional labels are affixed to business forms with conventional label applicator machines of the type designed to affix labels to containers in a packaging line. These machines intermittently feed delineated labels with a pressure-sensitive adhesive, in a series and spaced apart from each other on a release-coated carrier web. The carrier or "backer" as it is commonly called, is first used by the labeling machine to feed the label and to permit the label and its adhesive coating to be removed at the point of application. After removal of the label, the backer is disposed of as waste. Label applicators of this kind are made by Label Aire Company of Fullerton, Calif. and Quadrel Labeling Systems of East Lake, Ohio, as well as other manufacturers. These machines are made primarily to apply labels to a package or container in which the label is intended to be permanently affixed to the package or container.

A label lamination commonly called a "Piggy-Back" label is also used to affix a label to a business form. The Piggy- Back label has a label ply laminated to a first release-coated backer ply with pressure-sensitive adhesive. A second release-coated backer with pressure-sensitive adhesive is affixed to the opposite surface of the first backer. Thus, the Piggy-Back label consists of a label ply and two release coated backer plies in tandem with pressure-sensitive adhesive associated with each release coated backer ply.

In this arrangement, the label ply and first backer are affixed to a business form for printing after the second backer is removed. The adhesive-coated label ply is intended to be removed from the business form after computer printing. The first release-coated backer remains adhered to the form. Its purpose is to adhere the Piggy-Back label assembly to the form and to provide a release surface so the label ply and adhesive can be removed from the form for application to the surface to be labeled. This more expensive label assembly also provides a release coated backer ply which the labeling machine uses to feed the label.

One advantage of an integrated label form is that it permits computer printing the label at the time other variable information is added to the form. Piggy-Back labels are not particularly well suited to laser printing because laser printers do not perform as well in conjunction with uneven (i.e., raised) surfaces. Further, Piggy-Back label forms do not handle or stack as well as integrated forms because of the added thickness of the label and backer ply. Integrated label products have become popular where it is intended to use a laser printer to print the label because the printing surface of the label is co-planar with the corresponding surface of the business form, as will be appreciated.

SUMMARY OF THE INVENTION

The present invention provides a source of transfer patches (whether in the form of single ply labels or multiple-ply cards) spaced along a release-coated surface of a liner web, sometimes referred to as the carrier web. Each transfer patch includes at least a backer ply of liner material with one side release-coated, and a coating of pressure-sensitive adhesive on the release-coated side of the carrier ply. The source of transfer patches, preferably in the form of a roll, is unwound, with the liner web passing through a transfer station. The transfer patches are removed from the liner web and transferred seriatim and in spaced relation at predetermined intervals, to a reverse side of a form web with the pressure-sensitive adhesive adhering to the reverse side of the form web. Thus, the backer ply of the transfer patch is secured to the reverse side of the form web by means of the pressure-sensitive adhesive.

The other side of the form web (that is, the side opposite the side to which the transfer patch is adhered) is referred to as the "face" side. Printing, variable data, or bar-coding typically are applied to the face side of the form web but may also be applied to the reverse side. In addition, the invention may be used for forms incorporating top lamination, that is, application of a laminate to the face of the form web. Printing, etc., may be applied to the outer surface of the top laminate, if used.

The form web is moved along a path, and the form web is die cut in register with the transfer patches such that the die contacts the face side of the form web first and then cuts a delineated use segment (i.e., the label or card) from the form web in the dimensions of the intended label or card. The delineated use segment of the form web is in register with the transfer patch sure that the marginal edges of the transfer patch extend beyond the die impressions. In other words, the die cut is within the perimeter of the transfer patch. Thus, in the case of a label or a non-top-laminated card, the delineated use segment remains co-planar with the form web but is severed from it by means of the die cut. In the case of a top-laminated card, the top lamination is then enough as to present no substantial hindrance to laser printing. The delineated use segment remains in place, being removably secured to the backer ply of the transfer patch. The marginal edges of the uncut backer ply are secured to the main body of the form by means of the pressure-sensitive adhesive. The die cut is set such that the die severs the form web and, ideally but not necessarily, the adhesive coating, but it does not sever the backer ply.

Thus, the delineated use segment remains integral with the remainder of the web form. In the case of a single-ply label, when it is intended to apply the use segment for its intended purpose, the label is removed from the form web with the adhesive coating, due to the use of a differential adhesion characteristics between the reverse side of the form web and the backer ply. That is, adhesive coating has a greater affinity to the reverse side of the form web than it does to the release-coated surface of the backer ply. Typically, this is accomplished by a silicon release coating on the backer ply.

When it is desired to produce a laminated card, as distinguished from a single-ply label, the transfer patches further include a stiffener ply or other laminate secured on one side of the backer ply by dry adhesive and having its other side contacting the pressure-sensitive adhesive coating. The dry adhesive referred to may be one marketed by Precision Coated Products of Batavia, Ill., and others. The laminate is firmly bonded to the backer by the adhesive; yet the laminate may be readily peeled away from the backer and the thus exposed adhesive which typically remains on the backer is dry to the touch and has no substantial adhesive characteristic. The pressure-sensitive adhesive coating is such that the delineated use segment, when it is formed, is removed with the stiffener ply but the backer ply remains with the form. Thus, the delineated use segment in this case includes at least the ply die cut from the form, an intermediate layer of adhesive and a laminate.

The present invention, in summary, provides a method of making a wide range of desirable "integrated" products (labels, cards, top-laminated cards) using existing label applicator machines capable of removing transfer patches from a source roll and applying them at a controlled, predetermined spacing "repeat" on the reverse side of a segmented form web.

Other features and advantages of the present invention will be apparent to persons skilled in the art from the following detailed description of a preferred embodiment, accompanied by the attached drawing wherein identical reference numerals will refer to like parts in the various views.

BRIEF DESCRIPTION OF THE DRAWINGS

For the purpose of facilitating an understanding of the invention, there is illustrated in the accompanying drawings various embodiments thereof, from an inspection of which, when considered in connection with the following description, the invention, its construction and operation, and many of its advantages should be readily understood and appreciated.

DETAILED DESCRIPTION OF A PREFERRED EMBODIMENT

Figure 1:
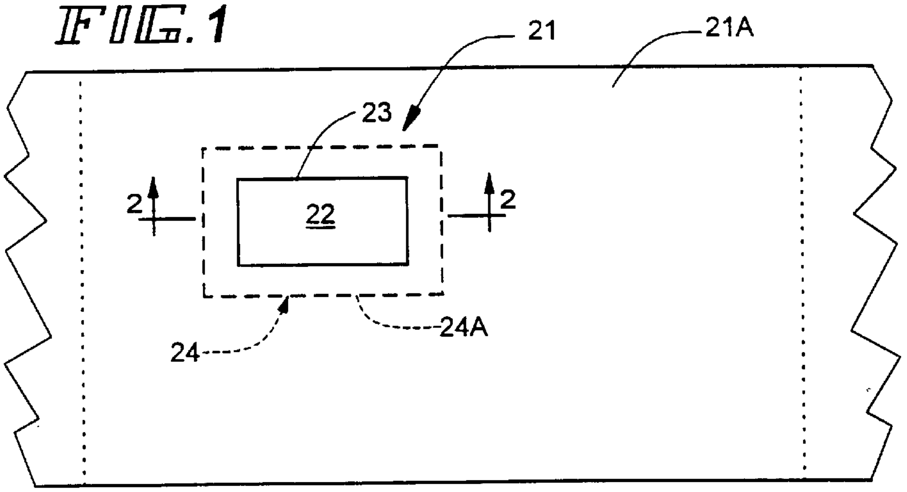
FIG. 1 is a fragmentary plan view of an integrated label product made according to the method of the invention.

Referring first to FIG. 1, an integrated label form 21 includes a label portion or ply 22 delineated by a die cut 23 through the thickness of the form web 21A. The reverse side of label 22 (that is, the side not seen in FIG. 1) is covered by a release-coated backer and adhesive assembly 24 that extends beyond the periphery of the label ply 22 to the dashed line 24A on at least one edge of label 22. As used herein, a form web is a series of interconnected label forms such as the one designated 21 in FIG. 1.

Figure 2:
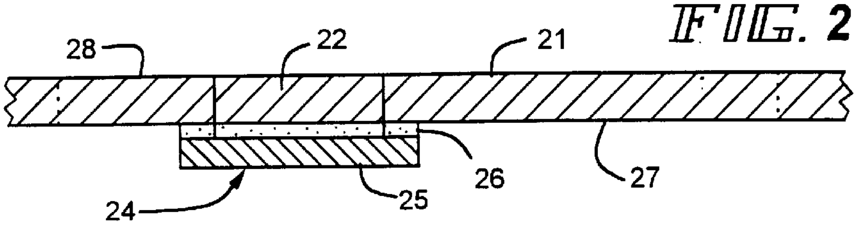
FIG. 2 is a sectional view taken along sight line 2—2 of FIG. 1.

As best seen in FIG. 2, the assembly generally designated 24 (sometimes referred to as a "patch" or "transfer patch)" includes a release-coated backer 25 and a pressure-sensitive adhesive 26 between the release-coated surface of backer ply 25 and the reverse surface 27 of form 21. In use, the face surface 28 of form 21 and label portion 22 are typically printed by a computer-controlled laser printer, and the form web is transported by conventional pin-fed marginal edges or feed rollers.

The label ply 22 can be peeled from the form 21 typically after information is added to the label by the printer. The pressure-sensitive adhesive 26 on backer 25 is removed with the label portion due to differential adhesion characteristics. The pressure sensitive adhesive 26 on removed label ply 22 may then be used to adhere the label to another surface. The remaining peripheral area of the pressure-sensitive adhesive 26 holds backer 25 to the lower surface 27 of the form 21 so it does not become detached from the form 21 when the label 22 is removed. The manner in which patch 24 is formed will be described in conjunction with FIG. 5. However, before turning to FIG. 5, reference is made to FIG. 3 which illustrates an integrated card product.

Figure 3:
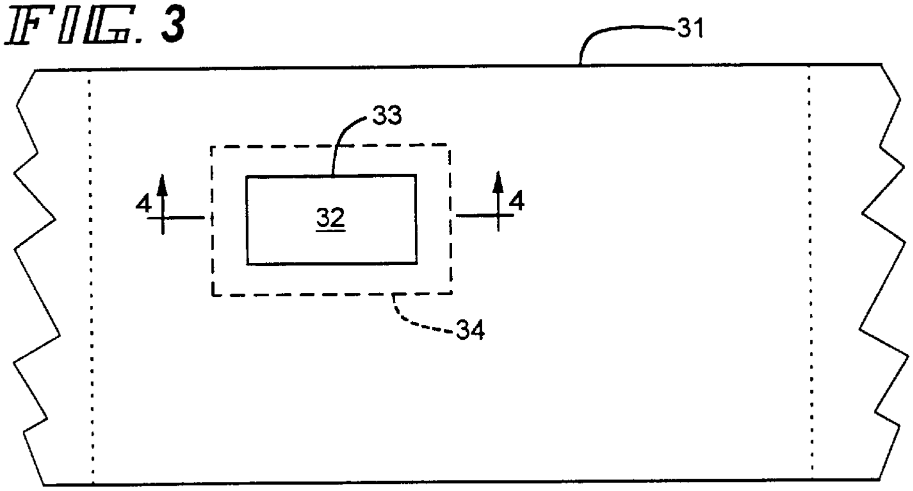
FIG. 3 is a fragmentary plan view of an integrated card product made according to the method of the invention.
Figure 4:
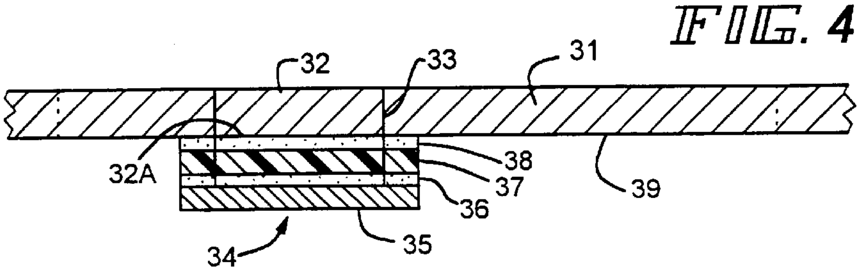
FIG. 4 is a side sectional view taken along sight line 4—4 of FIG. 3.

FIG. 3 shows a form web 31 with a card ply 32 delineated from the form web 31 by die cut 33. The card ply is juxtaposed with a transfer patch generally designated 34 and suitable for forming a card product. Patch 34 extends beyond the periphery of the delineated card ply 32 on at least one edge. The patch 34, as seen in FIG. 4, includes a release-coated backer ply 35. In contact with the release coated surface is a dry adhesive coating 36 which facilitates removal of the card, typically after computer controlled printing by a laser printer. Transparent plastic film or other laminate 37 is positioned between dry adhesive 36 and pressure-sensitive adhesive 38. Film or laminate 37 has one surface in contact with dry adhesive 36 to facilitate separation when the card is removed for use. The other surface of film 37 is coated with a pressure-sensitive adhesive 38 which adheres the patch 34 to the reverse surface 39 of the form web 31 and card ply 32. The film 37 is used to stiffen the card ply 32 or to give the reverse surface 32A of the card ply (which may contain printing) a smooth, typically transparent, protective covering.

Die cut 33 is made within the perimeter of at least one edge of the transfer patch, and through the form web 31, adhesive coating 38, film 37 and preferably but not necessarily through adhesive coating 36 but not through backer ply 35. The preparation and application of the patch 34 to the reverse side of the form web 31 will be described in conjunction with the apparatus in FIGS. 6 and 7.

In summary, what is shown in FIGS. 1–4 are integrated products in which a patch, or multiple-layered assembly, is applied as a unit to the reverse side of a form web. In the case of a label product (FIGS. 1 and 2) the patch assembly is simply a backer ply with an adhesive coating; and the label ply is formed from and integral with the form web. The die cut is made within the periphery of the patch, after the patch is applied and in register with the patch, but the die cut does not sever the backer ply 25 of the patch. The label product includes the label ply 22 and the portion of the adhesive coating 26 which transfers to the reverse side of the label ply 22 upon its removal for use.

In the case of a card product (FIGS. 3 and 4), the patch assembly includes a backer ply 35, a coating of dry adhesive 36, a laminate 37, and a layer of pressure-sensitive adhesive 38. Again, the patch assembly is applied to the reverse side of the form web; and a die cut 33 is made in register with, and within the perimeter of, the patch 34. The die cut extends through the form web 31, thus delineating the card ply 32 while maintaining it in the same planar relationship as the main body of the form web 31. The card product also includes the segment of adhesive coating 38, laminate 37 and dry adhesive 36 within the boundaries of the die cut 33. Either embodiment of FIGS. 1, 2 or FIGS. 3, 4 could equally will be a top-laminated form. The dry adhesive is not considered part of the card. Rather, the dry adhesive holds the card in place until removal. Ideally, the dry adhesive remains with the backer when the card is removed. In practice, sometimes a very thin, flaky residue remains on the back of the card.

Figure 5:
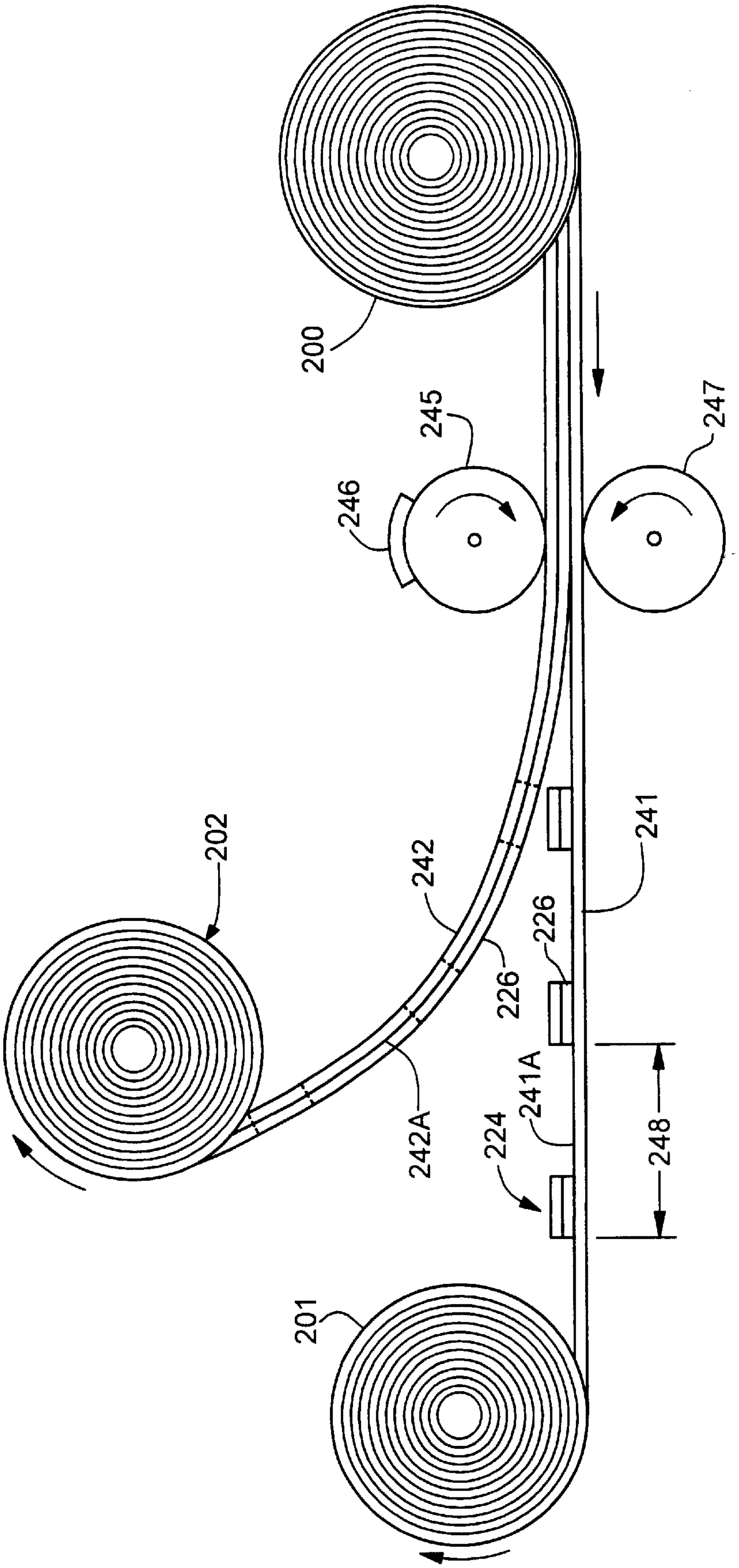
FIG. 5 is a diagrammatic view illustrating the material and preparation of adhesive-coated transfer "patches" used in the invention.

FIG. 5 illustrates the preparation of the source roll 201 of label patches 224. It includes a carrier web 241 with discrete spaced patches 224. An original roll of material such as Free Film Lite (brand) two-liner transfer tape marketed by Precision Coated Products of Batavia, Ill., is mounted for processing in a conventional label press. The roll 200 is made of two release-coated plies 241, 242 with pressure-sensitive adhesive 226 between and in contact with the release-coated sides opposing surfaces 241A, 242A respectively of plies 241, 242.

The release-coating on surface 241A of ply 241 releases more easily than does the release-coating on surface 242A. This is referred to as a differential release. Surface 241A is said to have the looser or easier release. Surface 242A is said to have the tighter release. Another way to express this is to say that the adhesive has a greater affinity to surface 242A than it does to surface 241A. The result is that when the plies 241, 242 are separated, the pressure-sensitive adhesive 226 remains with ply 242. The patches 224 are formed by die-cutting through at least the thickness of ply 242 (with the tighter release-coating) but not cutting ply 241. Rotary die holder 245 and die 246 rotate with impression roll 247. Die cutting may be performed by flat dies and impression plates, also well known in the art. Likewise, die-cutting may be a continuous cut or a perforation.

After die cutting, the plies 241, 242 are separated (for example, by means of a conventional peel bar or roller not shown in the drawing). The portion of ply 242 and adhesive 226 not forming the patches 224 is often referred to as matrix, and is separated from ply 241 and discarded as waste. The die cut portions of ply 242 and adhesive 226 form the discrete patches 224 which are on carrier web 241 at a repeat 248. Carrier web 241 with patches 224 are wound in a roll 201. This roll 201 becomes the source roll of patches for the label applicator machines 40, 100 of FIGS. 6 and 7 respectively.

Alternatively, the ply 241 can be the carrier web for card patches 34 shown in FIG. 4. In this case, the roll 200 is composite laminate such as Lite Lift Dry (brand) composite laminate stock provided by Precision Coated Products that provides multiple plies shown in FIG. 4 including backer 35, dry adhesive 36, transparent film 37 and pressure-sensitive adhesive 38, all carried on carrier 241. The discrete patches are made by die cutting through all the plies except ply 241 which becomes the carrier ply.

Figure 6:
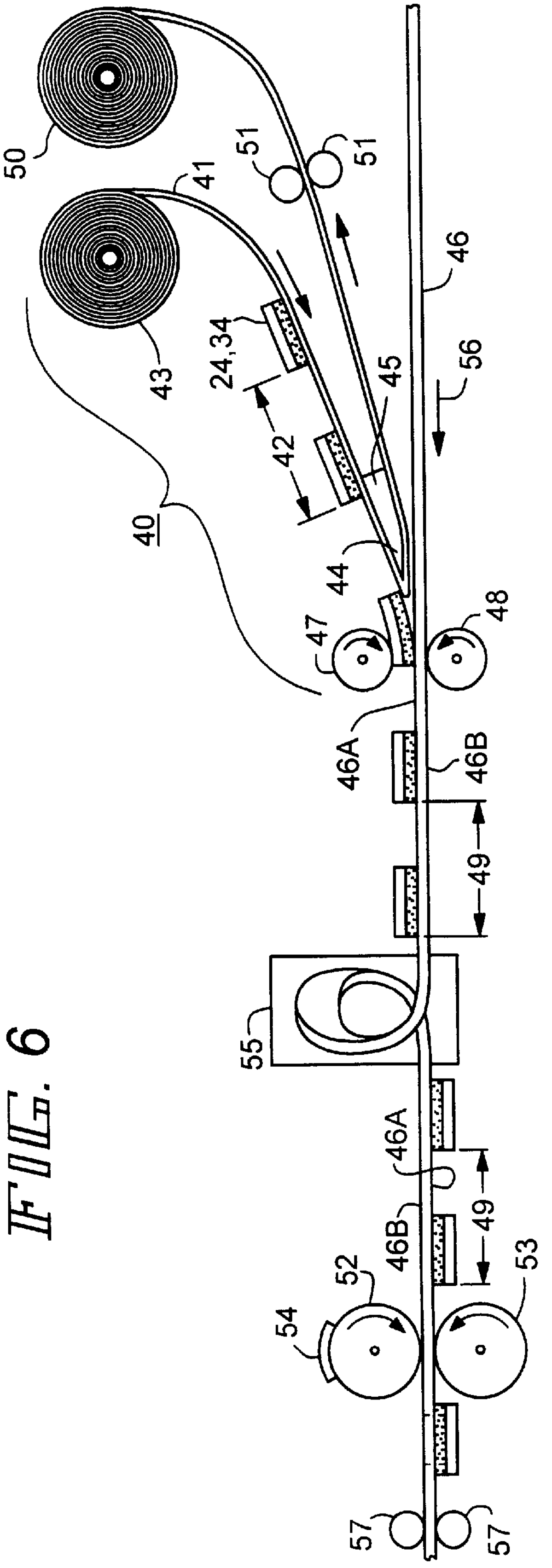
FIG. 6 is a side diagrammatic view of a system for making integrated products according to the present invention.

Apparatus for practicing the invention is shown in FIG. 6. A label applicator, such as are made by Quadrel and others for applying pressure-sensitive labels to packages is generally designated 40. Label applicator 40 is used to remove and transfer the patches 24 (FIGS. 1, 2) or 34 (FIGS. 3, 4) from a source roll 43 and to space them in a controlled spacing or "repeat" on a segmented form web. In operation, the applicator 40 unwinds carrier web 41 carrying a series of patches 24, 34 positioned at a first repeat 42 (sometimes referred to as a carrier web repeat). The web 41 is a release coated liner such as paper or film (carrier web 241 of FIG. 5) that carries the patches 24, 34 from the time of their manufacture. As described earlier, carrier web 41 and patches 24, 34 may be rewound into source roll 43 for transport and storage until ready for use in the applicator 40. The release coating (on surface 241A in FIG. 5) is usually a silicone material which permits the patches 24, 34 to be removed from the release coated surface of web 41. The characteristic of the release coating, the patches and the web are such that when the web 41 travels around a small radius 44 on plate 45, the patches, including adhesive, separate from the web 41 and continue on a path substantially parallel to the upper surface of plate 45 as shown in FIG. 6.

The applicator operates to advance the carrier web 41 one repeat length 42 for each patch to be transferred from carrier web 41 to form web 46.

The carrier web 41 may be fed intermittently by cooperating drive rolls 51, stopping when only a small portion of a patch remains adhered to the carrier web 41. The patches are removed from the carrier web 41 of the source roll 43 and transferred to the form web 46 at a form web repeat 49 by activating a transfer roll 47 cooperating with a supporting roll 48 in the label applicator 40.

It will be observed that the source roll is advanced incrementally (or "indexed") in accordance with the length of the repeat 42 on the source roll, whereas the transfer function is effected in accordance with the desired repeat 49 on the form web 46. Typically, repeat 49 is greater than repeat 42, although this is not emphasized in FIG. 6 for clarity. Similar transfer mechanisms are used in other label applicators. For example, the carrier web 41 may be continuously fed at a speed that presents each patch 24 for application by rollers 47, 48 at repeat 49 on the form web 46. After the patches 24, 34 are transferred, the carrier web 41 is rewound on roll 50 or otherwise disposed as a waste material. The spacing or repeat between patches on the carrier web 41 of source roll 43 is as small as practically possible to reduce waste, whereas the form repeat 49 on the form web is determined by the segment length of the label form (i.e., form web), and the number of labels on each label form segment.

After a patch 24, 34 is transferred to form web 46 the die cut 23, 33 (FIGS. 1, 3) is made to delineate the use product whether it is a label 22 (FIG. 1) or card 32 (FIG. 3). Die cut cylinder 52 cooperating with impression cylinder 53 are used for this purpose. The die cut cylinder 52 carrying die 54 can be above the form web by turning the form web over as shown in FIG. 6 using turning bar 55. If the user prefers, the cutting die may be below the form web, thereby obviating the need for the turning bar, however persons skilled in the art will appreciate that in such a case, the impression cylinder 53 must be located above the web. Thus the die cut can be from either the top or bottom of the form web 46. It will be observed, however, that in either case, the die cut is made through the form web 46 by first contacting the face side 46B of form web 46 and that the die cut does not sever the backer plies 25, 35 of the patches (FIGS. 2, 4).

Tamarack Products Inc. of Wauconda, Ill. makes die cut and web feeding systems that cut from either side (or even both sides) of a form web or label form 46. It is equally well known in the art that die cutting can be accomplished using flat dies in cooperation with flat impression surfaces. In cases where the cutting die is desired to be mounted above the web, for convenience perhaps, a turning bar arrangement diagrammatically shown at 55 may be used to turn the web over after application of the assemblies 24, 34 to the reverse side 46A of form web 46, and before the die cutting operation. Turning bar arrangements for turning a web over are well known in the art. The web 46 is moved in the direction of arrow 56 by web feeder 57, typically comprising friction feed rollers or pin feeding units. The completed integral label or card forms are delivered into folded packs, cut sheets, rewound into rolls or fed directly into additional machinery for further operations such as printing, cross perforating, slitting, folding, sheeting, collating gluing and the like.

Figure 7:
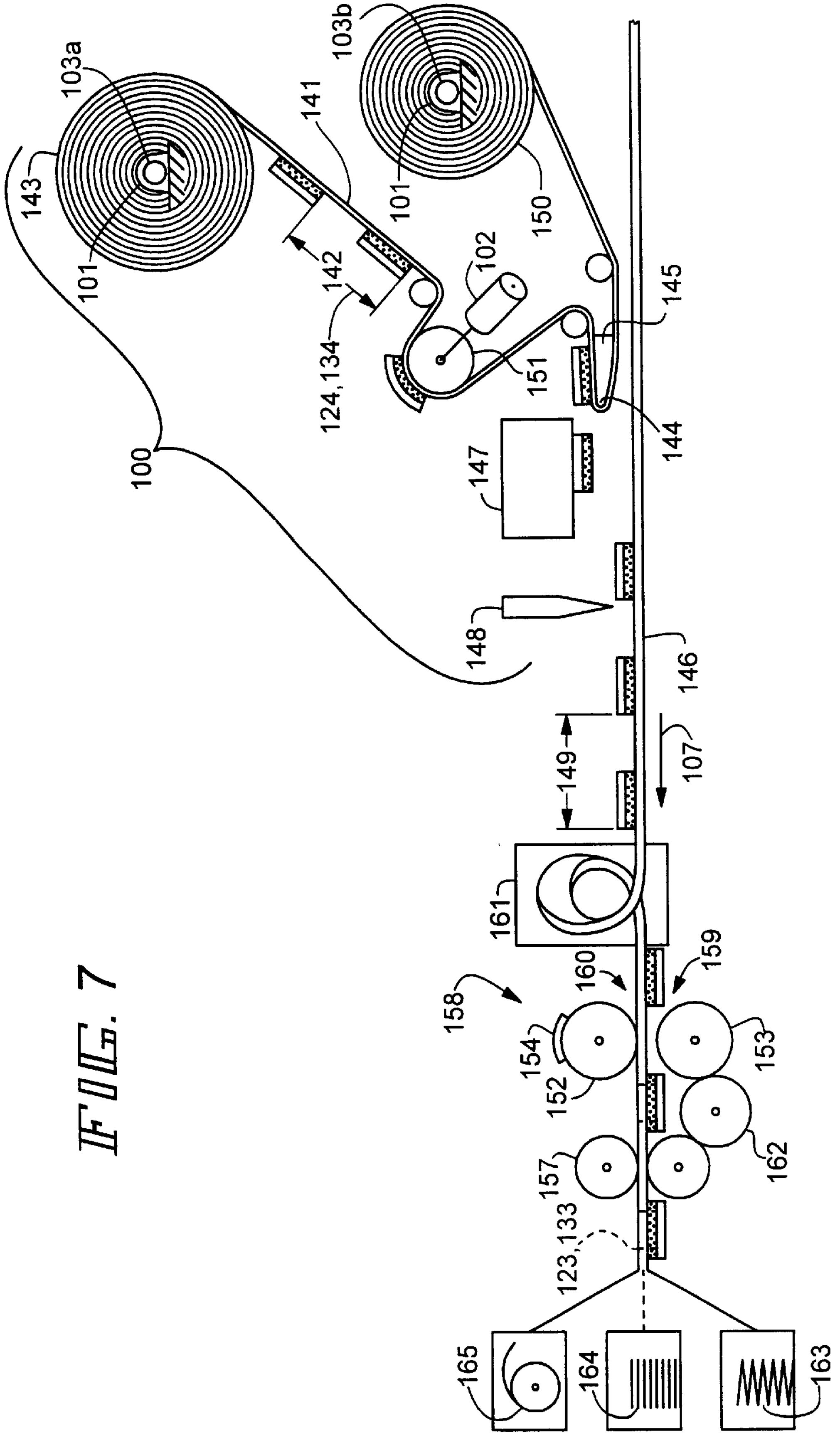
FIG. 7 is a schematic view of an alternate system for making integrated products according to the present invention.

FIG. 7 illustrates the apparatus utilized to make the integrated products by the method of the invention but with an alternate embodiment of label applicator apparatus similar to the type made by Label Aire. It is shown in FIG. 7 and generally designated 100. The applicator 100 is a self-contained machine including supporting frames 101 and drive motor 102. A source roll 143 of the patches 124, 134 (corresponding to previously described patches 24, 34) is supported by unwind shaft 103*a*. The unwound carrier web 141 of assemblies 124, 134 is directed to a stripping plate 145 in which a small radius edge 144 is formed to separate the assemblies 124, 134 from the carrier web 141 when the carrier 141 is routed approximately 180 degrees around edge 144. The carrier web is moved by means of feed roller 151. The feeding may be intermittent or continuous. An individual patch 124, 134 is removed from carrier web 141 by a grid 147 where it is held by suction applied to the top (or non-adhesive side) of patch 124, 134 until the time of transfer to form 146. A sensing means 148 is typically utilized to determine the position of form 146 and to send a signal to cause the transfer of the patch 124, 134 to form web 146 to define a predetermined repeat 149 of patches on the form web 146, which typically is different than the repeat 142 of the transfer patches on the source roll.

The transfer is made utilizing a short blast of air on the grid 147 causing the patch to be moved away from the grid 147 and adhere to the form web 146 by means of the adhesive coating on the underside of the patch. The machine 100 as described to this point is known in the art, but is designed and used for the purpose of applying adhesive-coated labels to products, forms, packages or containers rather than transfer patches.

The carrier web 141 with assemblies 124, 134 removed is rewound on shaft 103*b* for disposal as waste. The apparatus of FIG. 7 advances the form web 146 in the direction of arrow 107 such that a patch is applied at repeat 149 using feeding devices 157. Feeding of the form web is most commonly accomplished using conventional pin feeding devices but friction feed rollers may also be utilized. The form web 146 may be turned over by turning bar arrangement 161 and transported to a die cutting apparatus generally designated 158 to make the die cut 123, 133 through the carrier form 146 to delineate the integrated product. Die cutting is done with rotary blade holding cylinder 152 and impression cylinder 153. In this case the cutting die 154 is curved to conform to the circumference of the blade holding cylinder 152. Die cutting can also be accomplished using flat cutting dies cooperating with a flat impression surface as is well known in the art. Alternatively, die cutting can be made on the bottom surface of the carrier web as it appears in the area generally designated 159. This eliminates the need for the turning bar arrangement 161. It may be convenient, however, for the operator of the apparatus during set up and for observation while running, to make the die cut from the top surface of the web 146 as is shown in the area generally designated 160. A drive motor 162 is provided to power the feeding device 157 and die cutting apparatus 158 using gears, belts or individual drive motors. The delivery of the completed integrated products is made by fan folding them into packs 163, cutting them into individual sheets 164, rewinding them into a roll 165 or by delivering to additional apparatus for additional processing such as printers, collators or another applicator.

The label applicator 100 can be mounted in a set of frames incorporating feeding elements 157, die cutting apparatus 158, turn bar arrangement 161, drive motor 162 and delivery elements to fan-fold, sheet, rewind into a roll or transport to another machine. Alternatively, the frames can be modular containing one or more of the elements. This requires more than one set of frames to support all of the elements.

Conventional label applicator machines, such as those shown diagrammatically at 40 in FIG. 6 and at 100 in FIG. 7 are intended to separate labels already die-cut from label-forming stock, such as the "Free Film Lite" laminate stock material identified above. Typically, the source rolls used in label applicators include the adhesive-coated labels after the material exterior to the die-cut label segment is removed as described in connection with FIG. 5. This surrounding material, sometimes referred to as the "matrix" conventionally is removed from the carrier web in a separate operation and collected on a roll 202 which is disposed of as waste.

The present invention, however, does not require that the matrix be removed before the label segment (i.e., patch), or, in the case of FIGS. 3 and 4, the card patch, is separated from the source roll (43 in FIG. 6, 143 in FIG. 7) and transferred to the reverse surface of the form web. Thus, the steps illustrated in FIG. 5 in removing the matrix and accumulating the matrix in roll 202, are not essential. The structure of the matrix is such that it is able to continue past the peel radius 44, 144 and be rewound with carrier web 141 on waste roll 50, 150 (FIG. 7). This enables the label and adhesive, once die-cut, to be removed as a unit or "patch" during the separation step at 44 in FIG. 6 or 144 in FIG. 7.

It will be appreciated that, at least in the method of making the integrated label product (FIG. 6), the adhesive coating is transferred from the carrier web 41 with the transfer patch 24, 34. And when the die-cut label ply is removed from the form web, the adhesive is removed with it. Thus, the adhesive has a greater affinity to the reverse side of the form web than it does to the backer ply; but it also has a greater affinity to the backer ply than it does to the carrier web. This is deemed to be an important consideration in making a practical commercial end product.

In the case of the integrated card product, it is not important whether the dry adhesive is removed with the end product, but it is important that the pressure sensitive adhesive, when such is used, have sufficient affinity to the laminate that the laminate remains adhered to the card ply upon removal for use.

Alternatively, in the case of integrated cards, in place of an adhesive securing the use segment to the backer ply, a coating of polyurethane is cast adjacent a polyester backer. The polyurethane coating serves as a back lamination of the card. By coating the polyurethane directly on the polyester backer, there is no need for a separate adhesive. When the delineated use segment is removed for use, the portion of the urethane coat, serving as a laminate for the card, is separated from the backer. Still further, the polyurethane and polyester layers may be interchanged, with the polyester serving as the back laminate of the card, and the polyurethane as the backer ply.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. A method of making integrated, delineated-segment forms comprising:

providing a source of delineated transfer patches spaced along a release-coated side of a carrier web with a predetermined first repeat, each said transfer patch including at least a backer ply having a release coating on one side thereof, and adhesive on said release coated side by said backer ply for adhesively adhering each said patch to said release-coated side of said carrier web and characterized in that said release coating on said carrier web has a comparatively easy release relative to said release coating on said backer ply;

moving said carrier web with said transfer patches through a transfer station;

removing said transfer patches seriatim from said carrier web;

transferring said transfer patches to a reverse side of a form web with a predetermined second repeat different from said first repeat, said adhesive contacting said reverse side of said form web, the other side of said form web being a face side;

die-cutting said form web with a die within at least a portion of the perimeter of said transfer patches such that said die contacts said face side of said form web first and severs a delineated use segment in said form web and said transfer patch without severing said backer ply;

whereby said delineated use segment remains integral with the remainder of said form web by means of said backer ply, until said delineated use segment is removed therefrom.

2. The method of claim 1 wherein said adhesive is pressure-sensitive adhesive.

3. The method of claim 2 further characterized in that during said step of transferring, said adhesive is removed from said carrier web and remains with said backer ply.

4. The method of claim 3 wherein said step of providing a source of transfer patches comprises unwinding a roll of source material including a backer web and said carrier web with said adhesive being a continuous coating between said backer web and said carrier web, and die-cutting said backer web at said predetermined first repeat.

5. The method of claim 4 characterized in that said step of die cutting said backer web comprises cutting said backer web with a rotary die.

6. The method of claim 4 wherein the portion of said backer web and said adhesive coating surrounding said transfer patches forms a matrix and wherein said method further comprises the step of separating said matrix from said carrier web; and then winding said carrier web and said transfer patches into a roll comprising said source of transfer patches.

7. The method of claim 4 further comprising the step of winding said material into a roll after said step of die cutting said backer web to form said source of transfer patches without removing the matrix surrounding said transfer patches.

8. The method of claim 2 further comprising the step of winding said form web and said transfer patches into a roll for shipment or storage following said step of die cutting.

9. The method of claim 2 wherein said transfer patches are characterized in that said adhesive coating is adhered to said release-coated side of said backer ply, whereby said delineated use segment may form a label, and further characterized in that when said delineated use segment is removed from said form web, substantially all of said pressure-sensitive adhesive within the perimeter of said die cut transfers with said delineated use segment for adhering said use segment to a surface.

10. The method of claim 1 wherein said step of transferring said patches to said form web comprises transporting said carrier web with said transfer patches about a stripping plate to reverse the direction of said carrier web and thereby at least partially separating said patches from said carrier web, thereby facilitating removal of said adhesive coating from said carrier web whereby said adhesive remains with said transfer patch.

11. The method of claim 10 comprising the step of rewinding said carrier web into a roll for discard after removing said transfer patches therefrom.

12. The method of claim 10 further comprising the step of engaging said backer ply of each said transfer patch during said separation from said carrier web with a vacuum/pressure transfer device, applying said transfer patch to said reverse side of said form web at said second repeat and characterized in that said second repeat is greater than said first repeat.

13. The method of claim 1 further comprising the step of cutting said form web into sheets for shipment or storage after die cutting.

14. The method of claim 1 further comprising the step of folding said form web into a pack for shipment or storage after die cutting.

15. The method of claim 1 wherein said source of transfer patches is characterized in having differential release characteristics between said adhesive coating and said backer ply and said adhesive coating and said release-coated side of said carrier web;

whereby when said patches are removed from said carrier web and transferred to said form web, at least a substantial portion of said coating of pressure-sensitive adhesive is transferred.

16. The method of claim 15 wherein said source of transfer patches is a roll, said method further comprising the steps of unwinding said source roll and conveying the unwound carrier web and transfer patches to said transfer station.

17. A method of making a laminated product integral with a form web comprising:

providing a source of transfer patches spaced along a release-coated side of a continuous carrier web at a first repeat, each of said transfer patches including at least a backer ply, a laminate ply releasably adhered on one side to said backer ply, and adhesive on the other side of said laminate, said adhesive in contact with said release-coated side of said carrier web;

removing said transfer patches seriatim from said carrier web;

then transferring said transfer patches from said carrier web to a reverse side of a form web at a second repeat greater than said first repeat and with said adhesive coating on said other side of said laminate engaging and adhering to said reverse side of said form web, the other side of said form web being a face side;

then die-cutting said form web within at least a portion of the perimeter of said transfer patches by forcing said die at least through said form web from said face side, and then through said laminate coating but not through said backer ply, thereby forming a delineated use segment comprising the die-cut portion of said form web and said transfer patch exclusive of said backer ply;

whereby said use segment remains integral with the remainder of said form web, and when said delineated use segment is removed therefrom, said delineated segments of said laminate and said adhesive coating of said transfer patch are removed with said portion of said form web within said die cut, and said backer ply remains secured to said reverse side of said form web.

18. The method of claim 17 wherein said adhesive is a coating of pressure-sensitive adhesive and each of said transfer patches further comprises a laminate having one surface contacting said pressure-sensitive adhesive, dry adhesive on the other surface of said laminate, said backer ply being on the other side of said dry adhesive, whereby an integrated product formed by said method is an integrated card product.

19. The method of claim 18 characterized in that said step of die-cutting comprises die-cutting said face surface of said form web and said transfer patch with said die and serving said delineated use segment from said form web, said delineated use segment including at least the die-cut segment of said form web, said pressure-sensitive adhesive, and said laminate, but not said backer ply.

20. The method of claim 19 characterized in that said die cut is entirely within said perimeter of the associated transfer patch.

21. The method of claim 17 characterized in that said form web includes a top laminate on said face side in register with said delineated use segment.

22. The method of claim 17 wherein said adhesive is pressure sensitive and each of said transfer patches further comprises a laminate; said backer coated directly on said laminate, and characterized in that said backer is separable from said laminate, whereby the integrated product formed by said method is an integrated card product.

23. A method of making an integrated label comprising:

providing a source of transfer patches spaced along a release-coated side of a carrier web at a first repeat, each of said transfer patches including a backer ply having a release coating on one side thereof, and pressure-sensitive adhesive between said release-coated side of said carrier web and said release-coated side of said backer ply, said release coated side of said carrier web having a comparatively easy release characteristic relative to said release coating on said backer ply;

removing said transfer patches seriatim from said carrier web;

transferring said transfer patches seriatim from said carrier web to a reverse side of a form web at a second repeat greater than said first repeat and with said pressure-sensitive adhesive contacting said reverse side of said form web, the other side of said form web being a face side;

then die-cutting said form web within at least a portion of the perimeter of said transfer patches such that the die contacts said face side of said form web first and then cuts a delineated use segment from said form web and said pressure sensitive adhesive coating and does not cut through said backer ply;

whereby said delineated use segment of said form web and said adhesive defines a label and remains integral with said form web until removed therefrom, whereupon said adhesive coating within the perimeter of said die cut separates from said backer and is removed with said label.

* * * * *